(12) United States Patent
Holbrook

(10) Patent No.: US 6,599,545 B1
(45) Date of Patent: Jul. 29, 2003

(54) METHOD FOR MAKING A SANDWICH

(76) Inventor: Clayton T. Holbrook, 3939 W. Deer Orchard Dr., Bluffdale, UT (US) 84065

( * ) Notice: Subject to any disclaimer, the term of this patent is extended or adjusted under 35 U.S.C. 154(b) by 0 days.

(21) Appl. No.: 09/626,199

(22) Filed: Jul. 26, 2000

(51) Int. Cl.$^7$ ................................................ A21D 13/00
(52) U.S. Cl. ...................... 426/94; 426/283; 426/284; 426/496
(58) Field of Search ........................ 426/94, 283, 284, 426/138, 275, 496, 297

(56) References Cited

U.S. PATENT DOCUMENTS

| | | | |
|---|---|---|---|
| 3,656,968 A | 4/1972 | Allen | |
| 3,690,898 A | 9/1972 | Partyka | |
| 3,909,881 A | 10/1975 | Anderson | |
| 4,888,192 A | 12/1989 | Ramnarine | |
| 4,959,235 A | 9/1990 | Aquino et al. | |
| 4,963,377 A * | 10/1990 | Rimmeir | 426/283 |
| 5,194,283 A | 3/1993 | Dupas et al. | |
| 5,540,943 A | 7/1996 | Naramura | |
| 5,567,455 A | 10/1996 | Alsbrook, Sr. | |
| 5,622,742 A | 4/1997 | Carollo | |
| 5,641,527 A | 6/1997 | Burger | |
| 5,780,082 A | 7/1998 | Rebeaud | |
| 5,807,599 A * | 9/1998 | Weisberger et al. | 426/284 |
| 5,900,265 A | 5/1999 | Rutherford | |
| 6,004,596 A | 12/1999 | Kretchman et al. | |
| 6,228,406 B1 * | 5/2001 | Borzuta | 426/284 |

\* cited by examiner

Primary Examiner—Lien Tran
(74) Attorney, Agent, or Firm—Thorpe North & Western LLP

(57) ABSTRACT

A method for inserting one foodstuff, such as sandwich fixings, into a second foodstuff, such as a bread bun, which includes forming a cavity in the second foodstuff. The cavity may be formed by drilling with an elongated, cylindrical drill bit. The first foodstuff is inserted into the cavity by placing the first foodstuff into a carrier, and inserting the carrier into the cavity of the second foodstuff. The carrier is withdrawn while preventing the first foodstuff from exiting the cavity. The carrier can be a flexible sheet of material, onto which the first foodstuff is placed, rolled into a sleeve, and inserted into the cavity. The resulting foodstuff, such as a sandwich, has a substantially continuous wall of bread maintaining the first foodstuff within the second foodstuff.

18 Claims, 10 Drawing Sheets

METHOD FOR MAKING A SANDWICH

BACKGROUND OF THE INVENTION

1. The Field of the Invention

The present invention relates generally to a method for inserting a first, filler-type foodstuff into a second, shell-type foodstuff. More particularly, the present invention relates to a method for making a sandwich by inserting sandwich fixings into a cavity of a bread bun.

2. The Background Art

Sandwiches are a popular food item enjoyed by many people of various ages. The main feature of many lunches is a sandwich. Sandwiches typically comprise two slices of bread, and a combination of sandwich fixings disposed between the bread slices. Such sandwiches may be "cold" or "hot." Cold sandwiches often include items such as cold cuts, while hot sandwiches may be entirely heated, or include a heated item, such as meat balls. Many sandwiches are made at home, or purchased from specialty sandwich shops.

Although sandwiches may have innumerable combinations of bread types and fixing types, many people share common requirements of their sandwich. For example, it is often desirable that the sandwich be fresh, or have fresh bread and fresh fixings. In addition, it is often desirable that the sandwich be made fresh. While it is common for a sandwich to be pre-prepared, such as by making the sandwich in the morning, the fixings tend to seep into the bread, making the bread soggy and undesirable.

Another common prerequisite for sandwiches is that the sandwich stay together, or maintain its structural integrity. It will be appreciated that the contents of the sandwich often become separated from the bread while the sandwich is being eaten, often resulting in lost, inedible food, and/or messy clothes or eating area.

Some efforts have been directed towards improving sandwiches, such as by sealing the contents of the sandwich in the bread, and providing baked shells, examples of which may be found in U.S. Pat. Nos. 6,004,596 and 5,567,445. It is believed that the baked shells lack popularity due to the large amount of crust, both on the outside and inside, that is produced. In addition, it is believed that sealing sandwich contents in the bread is only feasible for particular types of sandwich fixings which prevent moisture from reaching the bread, such as peanut butter. Despite these efforts, the vast majority of sandwiches are produced, both at home and commercially, with the traditional contents "sandwiched" between two slices of bread.

Other food items have been developed, which are similar in many respects to sandwiches, and which may have been developed to address the drawbacks of typical sandwiches. For example, pocket-type food items have a layer of dough wrapped about a meat substance and backed or cooked. Some examples are shown in U.S. Pat. Nos. 5,622,742; 5,780,082; and 4,888,192. It is believed that such types of food are limited to baked or cooked food, and are ill suited for many sandwiches, such as cold cuts. In addition, it is believed that such pocket-type food items are unsuitable for typical sandwiches because the outer, dough layer has a crust consistency, and lacks a bread-like consistency.

Still other food types include injecting one food substance into another. For example, a jelly or cream may be injected into a donut or bagel. Examples of injecting are described in U.S. Pat. Nos. 5,900,265 and 5,641,527. Still other food types include extruding one or more food substances. Examples of extruding food are described in U.S. Pat. Nos. 5,194,283 and 4,888,192. It is believed that injection and extrusion methods are unsuitable for traditional sandwiches.

SUMMARY OF THE INVENTION

It has been recognized that it would be advantageous to develop a sandwich with traditional texture and consistency, but without traditional messiness. In addition, it has been recognized that it would be advantageous to develop a method for making such a sandwich. In addition, it has been recognized that it would be advantageous to develop a method for disposing one foodstuff into another foodstuff.

The invention provides a sandwich with a foodstuff disposed in a cavity of a pre-baked bread bun. The bread bun has a substantially continuous wall forming a unitary, integral shell, and an exterior crust. The cavity is formed in the bread bun without an interior crust. An opening is formed in the exterior crust extending to the cavity. The food stuff advantageously is arranged in arcuate layers in the cavity.

In accordance with one aspect of the present invention, the cavity in the bread bun can have a substantially circular shape. The arcuate layers of the sandwich fixings can conform to the substantially circular shape of the cavity of the bread bun.

In accordance with another aspect of the present invention, the sandwich fixings can have a layered configuration in the cavity of the bread bun that is substantially the same as a layered configuration prior to insertion into the cavity of the bread bun.

In accordance with another aspect of the present invention, the arcuate layers of the sandwich fixings can include: 1) an arcuate layer of sliced meat; 2) an arcuate layer of sliced cheese; and 3) an arcuate layer of sliced vegetable or fruit.

Additional features and advantages of the invention will be set forth in the detailed description which follows, taken in conjunction with the accompanying drawing, which together illustrate by way of example, the features of the invention.

DETAILED DESCRIPTION

Figure 1:
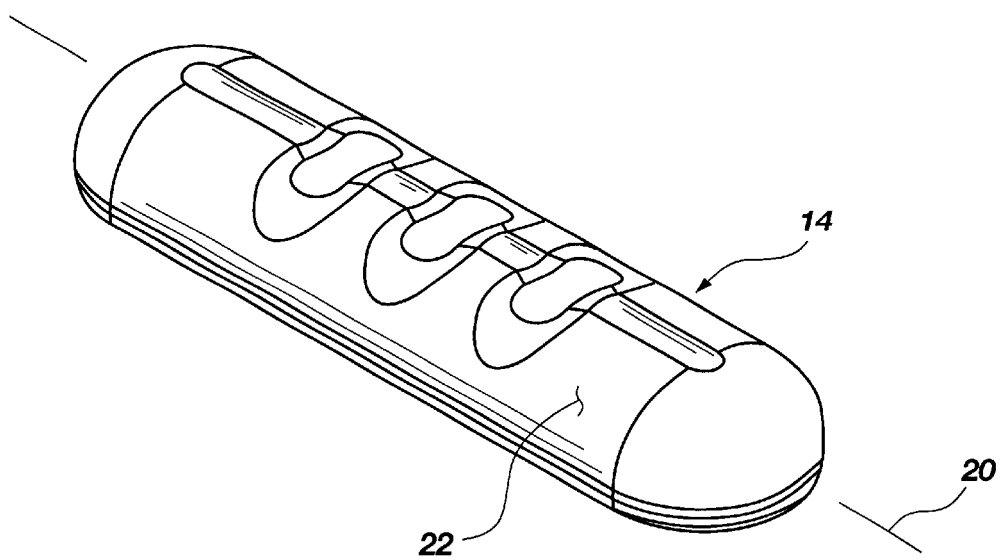
FIGS. 1–4 are perspective views of a method of making a sandwich (FIG. 4), or inserting a first, filler-type foodstuff or sandwich fixings (FIG. 3) into a second, shell-type foodstuff or bread bun (FIGS. 1 and 2), in accordance with the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

A method is illustrated in the Figures for inserting a first, filler-type foodstuff into a second, shell-type foodstuff in accordance with the present invention which is particularly well suited for making sandwiches. The term "foodstuff" is used broadly herein to refer to edible substances, including for example, bread, buns, meat, cheese, fruits, vegetables, tomatoes, lettuce, onions, condiments, etc. The term "filler-type foodstuff" is used broadly herein to refer to any type of edible substance that is disposed in or on another, including for example, sandwich fixings, etc.; while the term "shell-type foodstuff" is used broadly herein to refer to any type of edible substance that is disposed around another, including for example, bread, buns, etc.

Sandwiches and sandwich making may be a field which may benefit from use of such a method. Thus, the method of the present invention will be described with particular reference to sandwiches and sandwich making. By way of example, the method of the present invention is illustrated in making a sandwich, indicated generally at 10 in FIG. 4, where the first foodstuff includes sandwich fixings, indicated generally at 18 in FIG. 3, and the second foodstuff is a bread bun, indicated generally at 14 in FIGS. 1 and 2. The term "bread bun" is used broadly herein to refer to any type of bun or bread, including for example, a hoagie bun; while the term "sandwich fixings" is used broadly herein to refer to any type of sandwich ingredient or component, including sliced meat, sliced cheese, sliced tomatoes, sliced onions, shredded lettuce, sliced pickles, olives, mayonnaise, vinegar, mustard, salt and pepper, etc.

Figure 2:
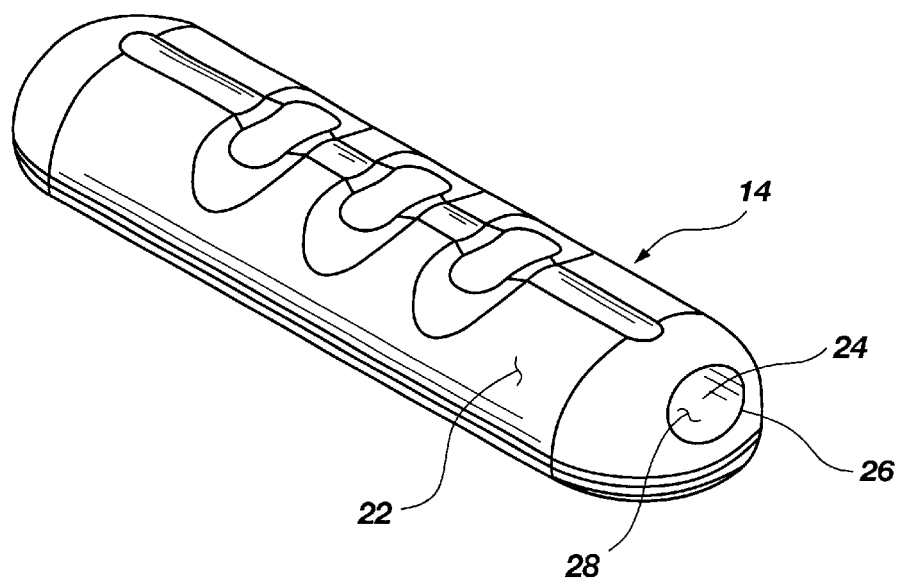

Referring to FIG. 1, a bread bun 14 is provided, which may be an elongated, hoagie-type bun, as shown, with a longitudinal axis 20. The bread bun 14 preferably is pre-baked to have an outer or exterior crust 22 and a substantially filled, fleshy interior. The exterior crust 22 may be harder than the softer, fleshy interior. Referring to FIG. 2, a cavity 24 is formed in the bread bun 14, and an opening 26 is formed through the crust 22 to the cavity 24. The cavity 24 preferably is elongated and extends substantially the length of the bread bun 14. In addition, the cavity 24 preferably is formed without a crust, or with an inner or interior surface 28 which is the same as the fleshy interior of the bread bun 14, so that the bread bun 14 maintains a more sandwich-like structure and consistency. Alternatively, the cavity 24 may be pre-formed in the bread-bun 14, such as by being baked in, although such a process may create an interior surface which also is a crust, and thus give the bread bun a more crusty texture and consistency.

The cavity 24 in the bread bun 14 advantageously forms a hollowed bread bun with a unitary or integral shell formed of a substantially continuous wall of bread. Thus, unlike traditional sandwiches, the bread bun 14 with a cavity 24 forms a pocket with the breaded side walls preventing any contents of the cavity 24 from escaping. In addition, the bread bun 14 retains its bread-like consistency and structure, which is familiar and enjoyable, without presenting a hard crusty, or thin doughy, layer.

Figure 3:
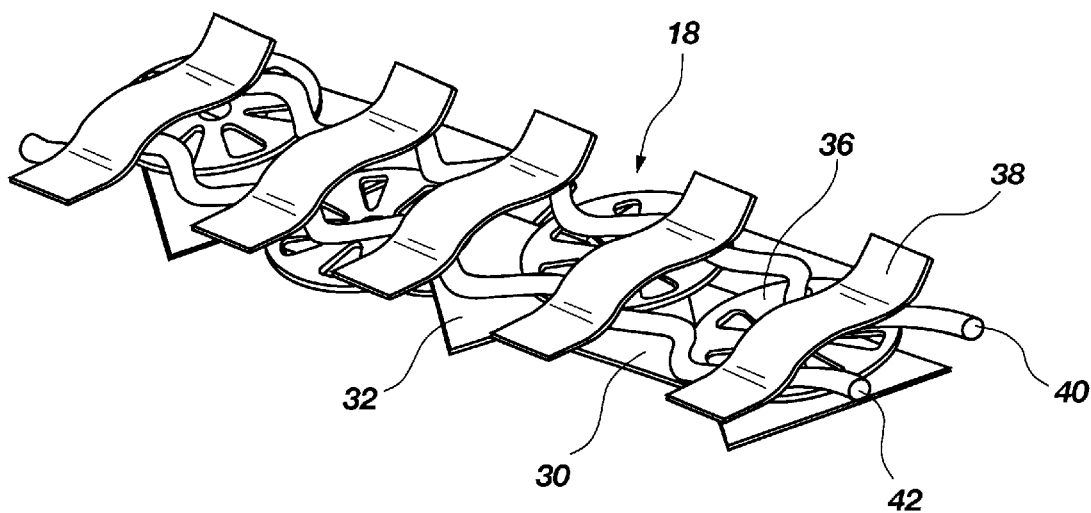
Figure 4:
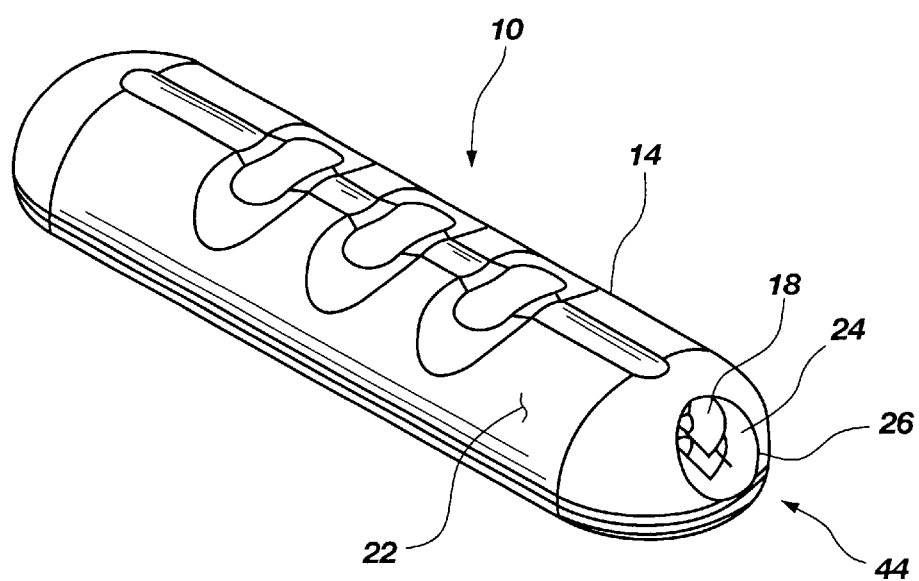

Referring to FIG. 3, the sandwich fixings 18 are prepared for being inserted into the cavity 24 of the bread bun 14. As stated above, the sandwich fixings 18 may include sliced meat 30, sliced cheese 32, fruits and/or vegetables, such as sliced tomatoes 36 and lettuce 38, etc. In addition, the sandwich fixings 18 may include condiments, such as mustard 40 and mayonnaise 42. All of the sandwich fixings 18 may be provided in layers. Referring to FIG. 4, the sandwich fixings 18 advantageously are inserted through the opening 26 in the exterior crust 22 and into the cavity 24 of the bread bun 14, indicated by arrow 44, to form the sandwich 10. The fixings 18 preferably are inserted together to maintain the freshness and dryness of the bread bun 14. In addition, the sandwich 10 preferably is prepared immediately prior to consumption to further prevent the bread bun 14 from becoming overly moist from the fixings 18.

As stated above, the fixings 18 preferably are inserted together. The fixings 18 advantageously can be inserted into the cavity 24 utilizing a carrier. The carrier advantageously maintains the sandwich fixings 18 together, and provides a rigidity or structure to facilitate insertion. It will be appreciated that some fixings 18 may be loose and flexible, especially when combined together. In addition, it will be appreciated that the fixings 18, when assembled, may be larger than the opening 26 in the crust 22 or bread bun 14. Thus, the carrier can hold the fixings 18 together, and present the fixings 18 in a size similar to the opening 26.

Figure 5:
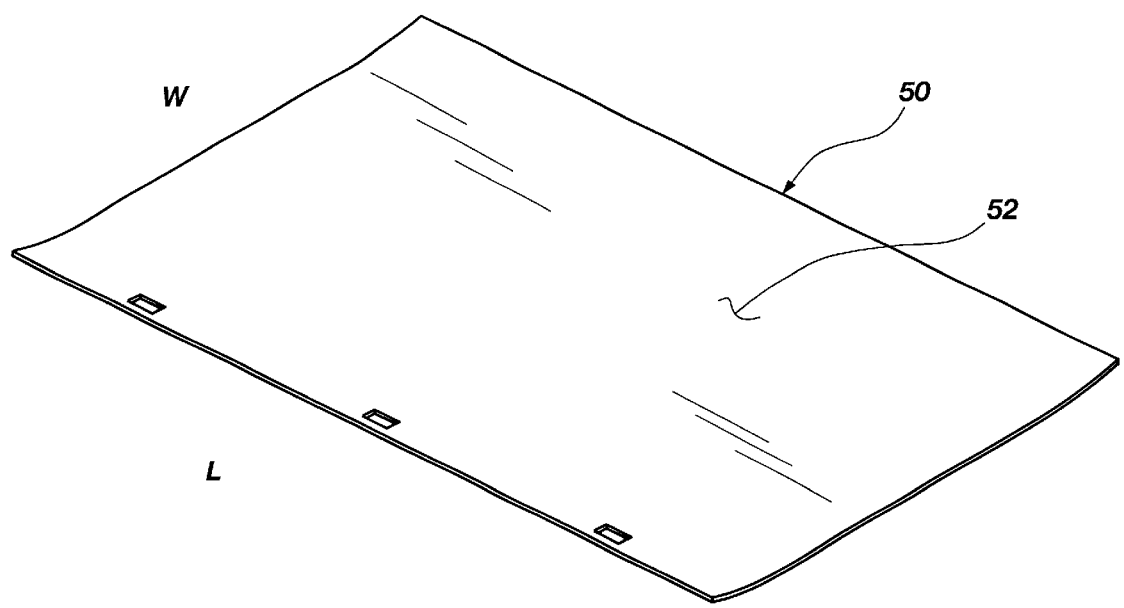
FIGS. 5–10 are perspective views further illustrating the method shown in FIGS. 1–4, or inserting the first foodstuff or sandwich fixings into the second foodstuff or bread bun, using a flexible sheet (FIG. 5) or carrier in accordance with the present invention.
Figure 6:
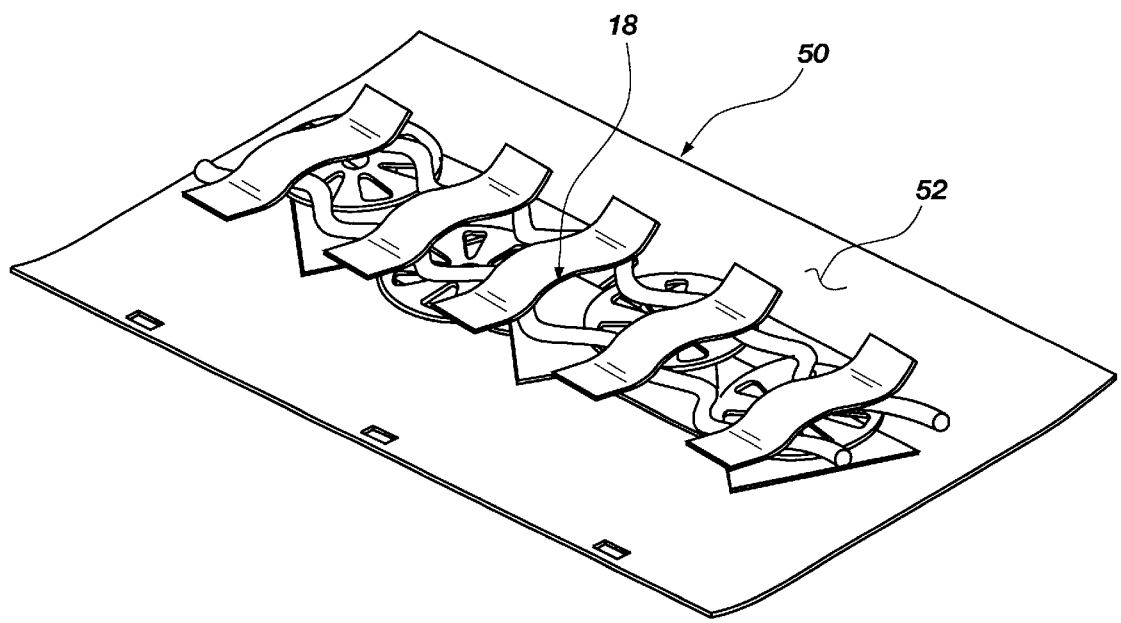

Referring to FIG. 5, the carrier can be a flexible sheet 50 of material, such as food grade plastic, which is flexible enough to be bent, and provides a low friction surface 52. The sheet preferably has a length L substantially equal to or greater than the length of the cavity 24 or bread bun 14, and a width equal to, or greater than, the circumference of the opening 26 in the bread bun 14. Referring to FIG. 6, the sandwich fixings 18 can be placed onto the surface 52 of the flexible sheet 50. In addition, the fixings 18 may be arranged on the sheet 50 in a similar fashion as they might be placed onto a traditional sandwich, such that the sheet 50 acts as a pseudo slice of bread. Thus, the fixings 18 may be arranged in layers on sheet 50.

Figure 7:
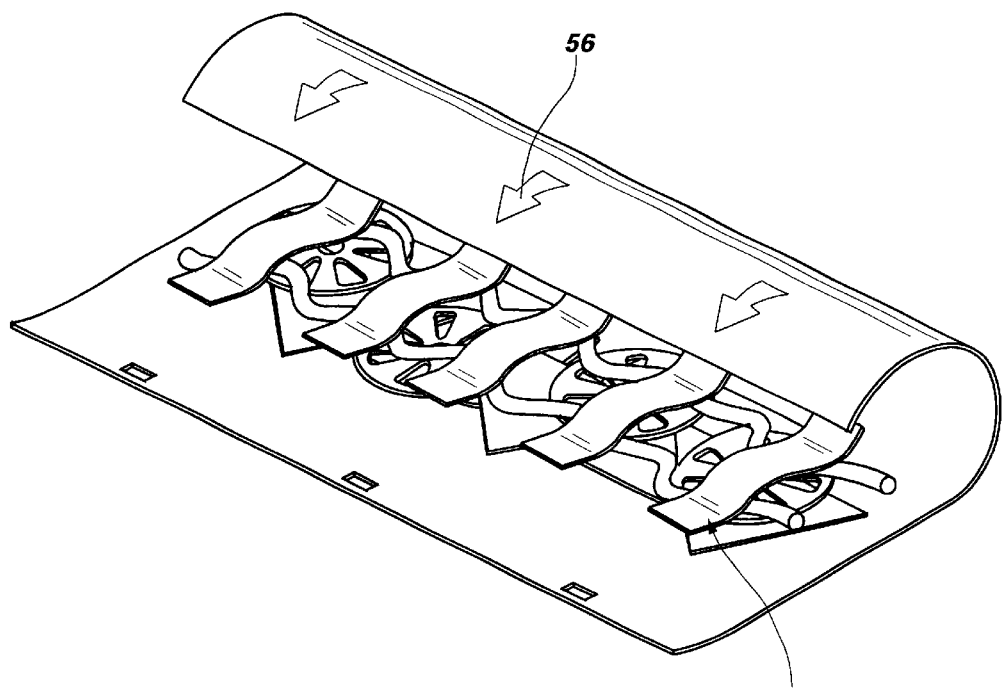
Figure 8:
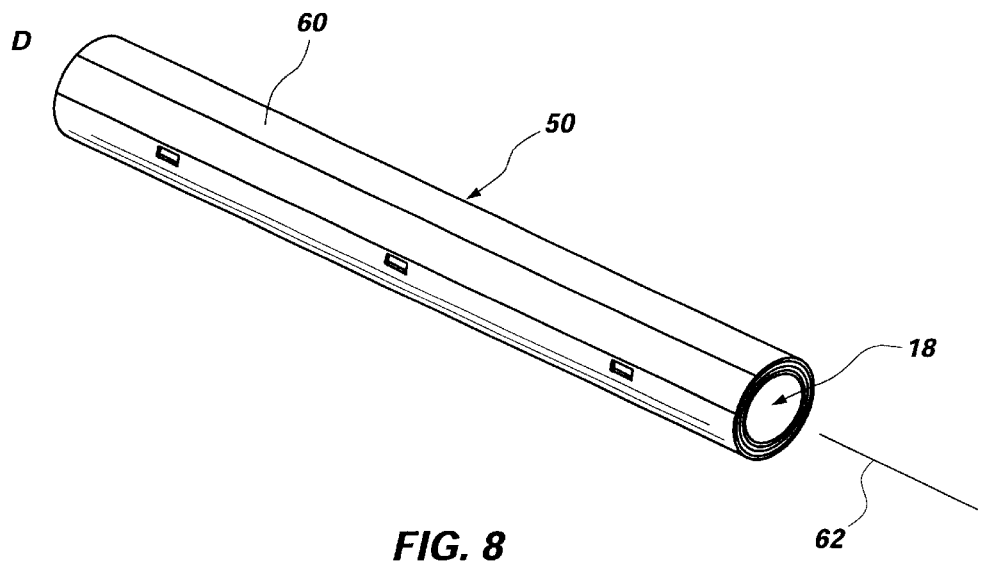

Referring to FIG. 7, the flexible sheet 50, with the sandwich fixings 18 thereon, may be rolled together, as indicated by arrows 56, into a cylindrical, tubular sleeve 60 with the fixings 18 therein. Many types of fixings 18, such as sliced meat and cheese, can be flexible, and can roll into arcuate layers within the sleeve 60. Preferably, the sheet 50 is rolled into a sleeve 60 with a diameter D equal to, or less than, a diameter of the opening 26 in the bread bun 14. Although the sheet 50 is flexible, rolling the sheet 50 into the sleeve 60 advantageously provides rigidity. The sleeve 60 has a longitudinal axis 62.

Figure 9:
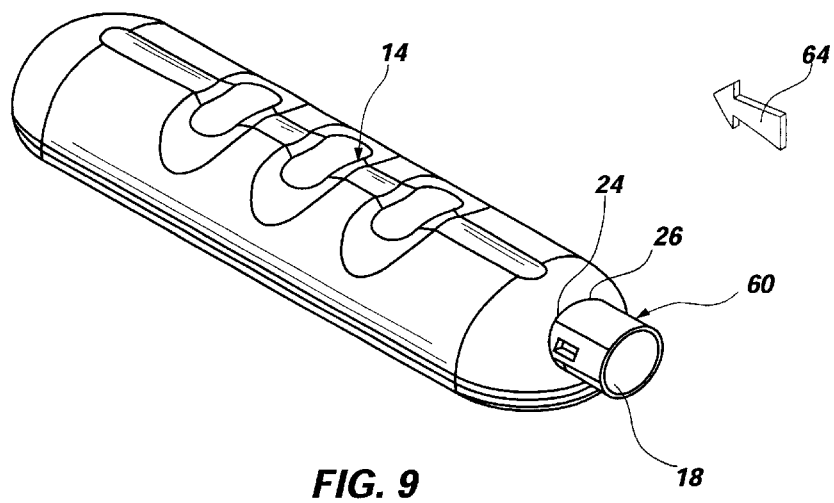

Referring to FIG. 9, the sleeve 60, with the sandwich fixings 18 therein, can be inserted through the opening 26 of the bread bun 14, and into the cavity 24, indicated by arrow 64. Preferably, the sleeve 60 is inserted the entire length of the cavity 24. As stated above, the sleeve 60 provides rigidity for inserting the sleeve 60 into the cavity 24 of the bread bun 14.

Figure 10:
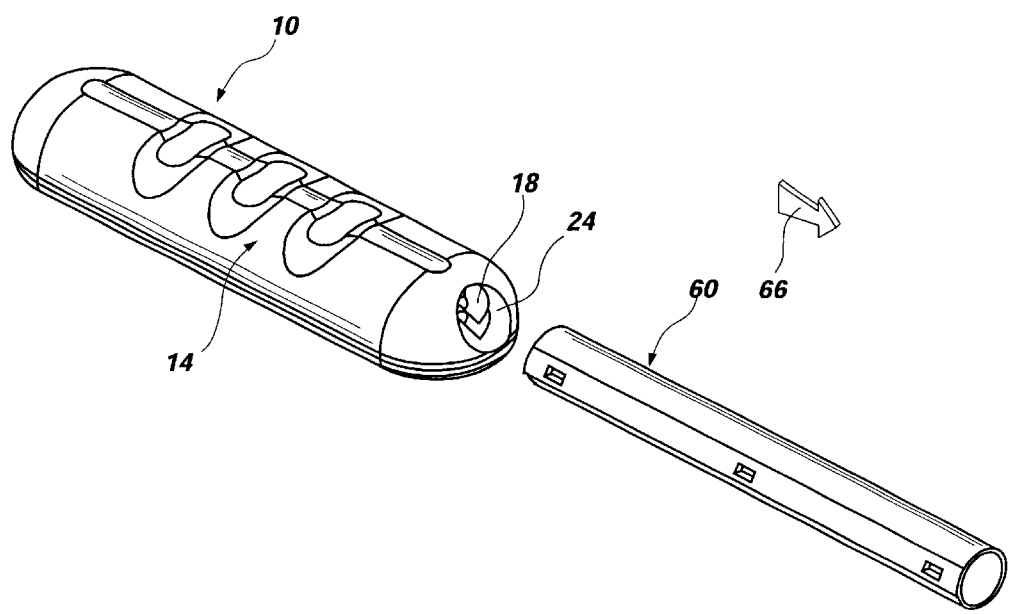

Referring to FIG. 10, the sleeve 60 then can be withdrawn from the cavity 24, indicated by arrow 66, while leaving the fixings 18 within the cavity 24 to form the sandwich 10. It may be necessary to prevent the fixings 18 from exiting the cavity 24 with the sleeve 60. As stated above, the sheet 50 preferably has a low friction surface 52, so that the inner surface of the sleeve 60 also has low friction, to facilitate sliding the fixings 18 out of the sleeve 60 and into the cavity 24.

Figure 11:
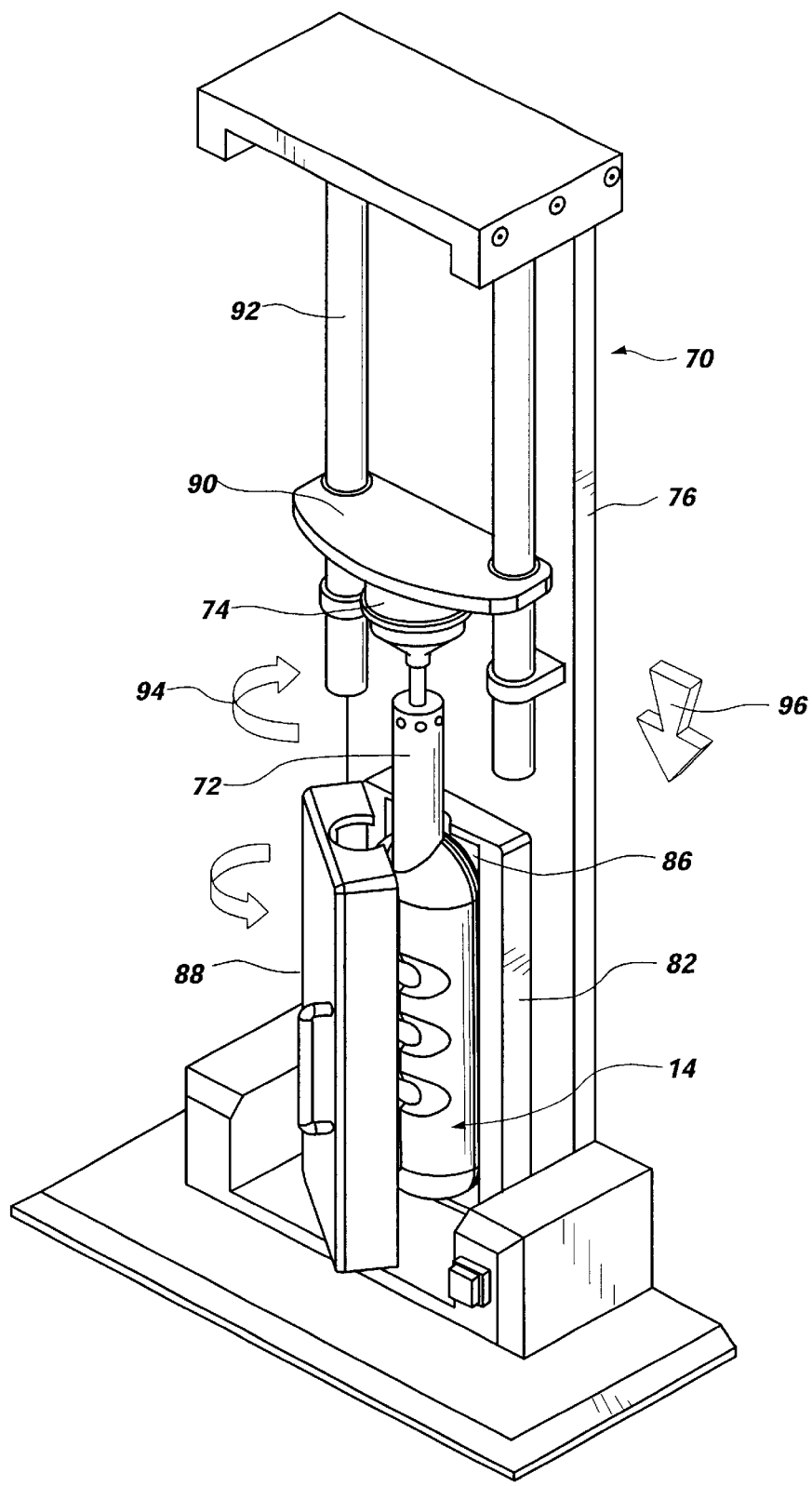
FIGS. 11 and 12 are perspective views further illustrating the method shown in FIGS. 1–4, or forming a cavity and opening in the second foodstuff or bread bun using an elongated cylindrical drill bit, in accordance with the present invention.
Figure 12:
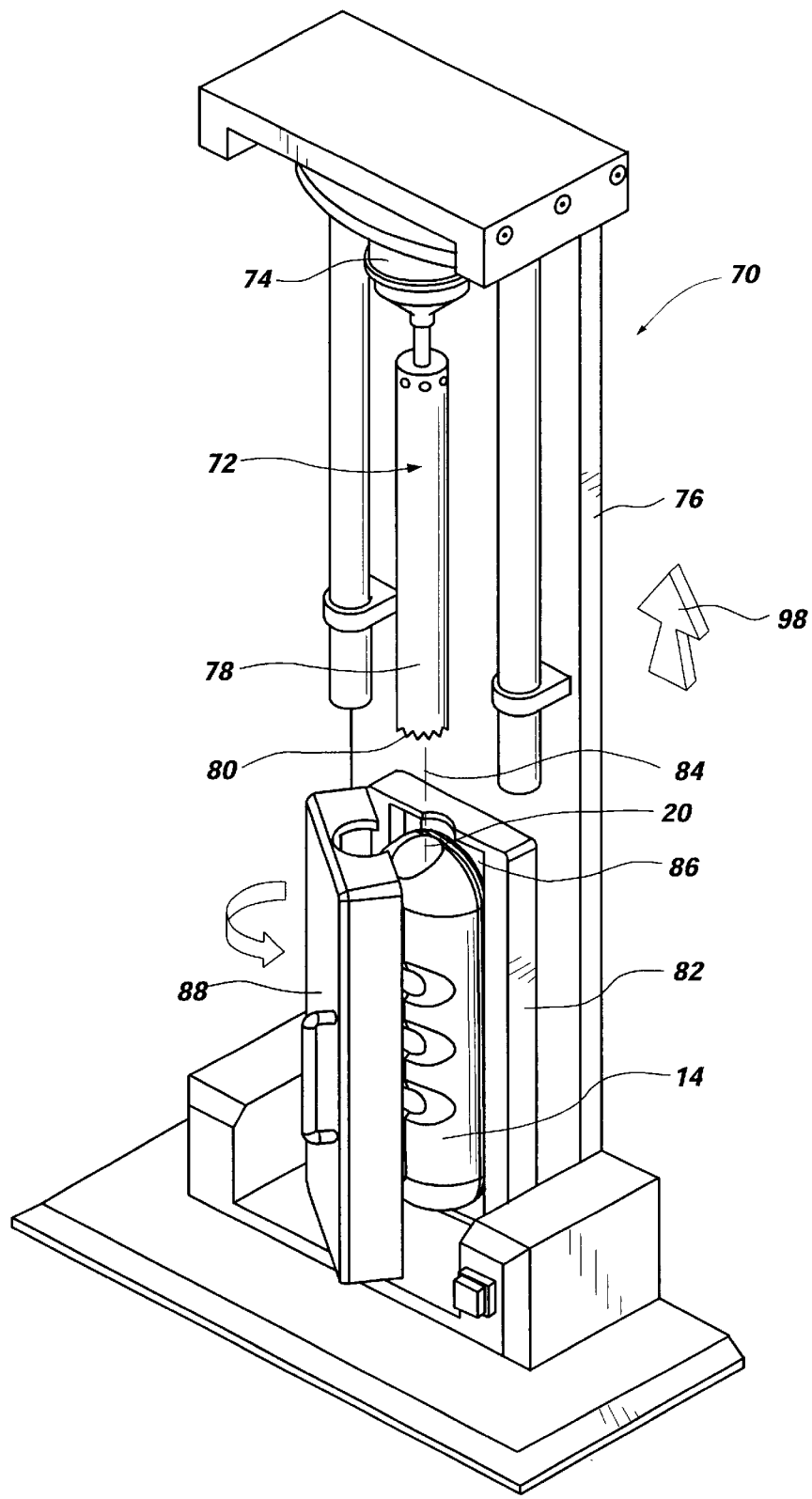

Referring to FIGS. 11 and 12, a drilling device 70 is shown for forming the cavity 24 in the bread bun 14. The drilling device 70 advantageously has an elongated, hollow, cylindrical drill bit 72 rotatably driven by a motor 74. The motor 74 may be movably disposed on a base 76. The drill bit 72 preferably has an open end 78 with a serrated edge 80 for cutting. A holding enclosure 82 can also be disposed on the base 76 for receiving and holding the bread bun 14. The holding enclosure 82 orients and maintains the longitudinal axis 20 of the bread bun 14 aligned with, or concentric with, a longitudinal axis 84 of the drill bit 72. An indentation 86 may be formed in the holding enclosure 82 for receiving the bread bun 14. A lid or restraint 88 may be pivotally coupled to secure the bread bun 14 in the indentation 86. Preferably, the holding enclosure maintains the bread bun 14 substantially immobile.

As stated above, the motor 74 and drill bit 72 may be slidably disposed on the base 76, such as being attached to a carriage 90 slidably disposed on sliders 92 attached to the base 76. The carriage 90 and sliders 92, and thus the drill bit 72, can be aligned to displace along the longitudinal axes 20 and 84. Referring to FIG. 11, the drill bit 72 may be rotated by the motor 74, indicated by arrow 94, and displaced longitudinally, indicated by arrow 96, so that the drill bit 72 engages and drills into the bread bun 14. As the drill bit 72 rotates 94 and displaces 96, the serrated edge 80 cuts a cylindrical hole into the bread bun 14, leaving the cavity 24.

After the drill bit 72 has traveled to the desired depth, preferably just short of the end of the bread bun 14, the drill bit is withdrawn, as indicated by arrow 98 in FIG. 12. It will be appreciated that the drill bit 72 may leave a cylindrical slug of bread, which may be left in the bread bun 14, or may be withdrawn with the drill bit 72. In either event, the bread slug may be pulled from either the drill bit 72 or bread bun 14. Alternatively, the drill bit 72 may shred or cut the bread in the drill bit, leaving crumbs. The bread bun 14, with the cavity 24, then can be removed from the holding enclosure 82.

The drilling device 70 may be vertically oriented as shown, much like a drill press. Alternatively, the device 70 may be vertically oriented with the holding closure 82 disposed above the drill bit 72, opposite as shown, so that crumbs may fall out under the force of gravity.

Although the drill bit 72 and motor 74 have been described as displacing on the base 126, it is of course understood that the holding enclosure 82 and bread bun 14 may displace on the base 126 towards the drill bit 72.

Figure 13:
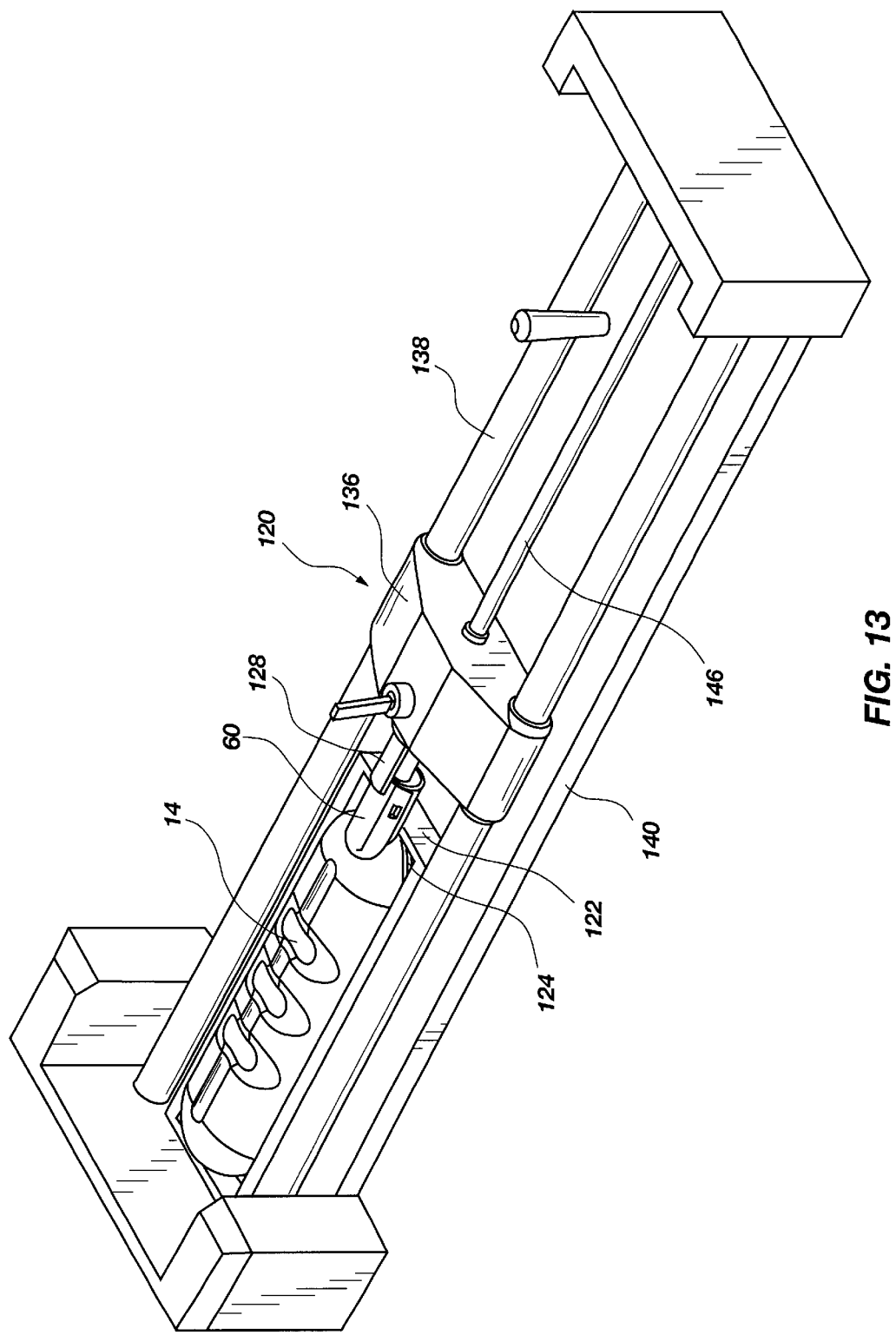
FIGS. 13–15 are perspective views further illustrating the method shown in FIGS. 1–10, or withdrawing the flexible sheet from the first foodstuff or bread bun without withdrawing the first foodstuff or sandwich fixings using an extraction means, in accordance with the present invention.
Figure 14:
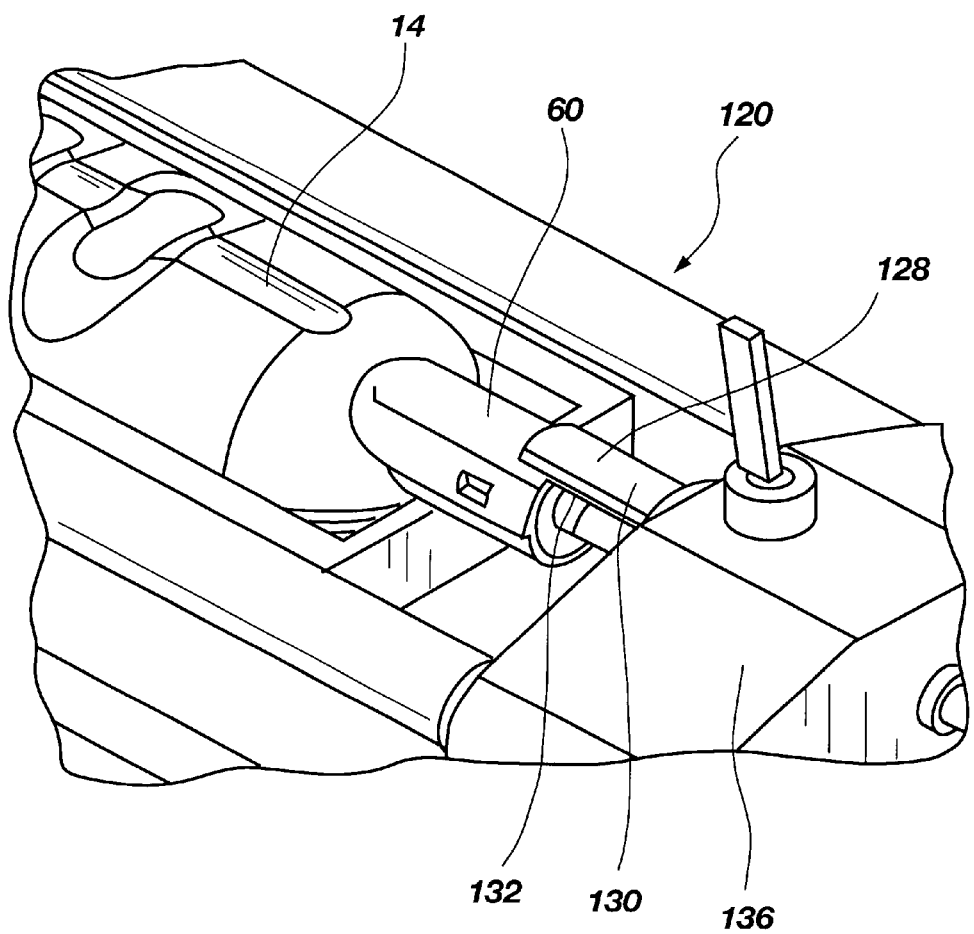
Figure 15:
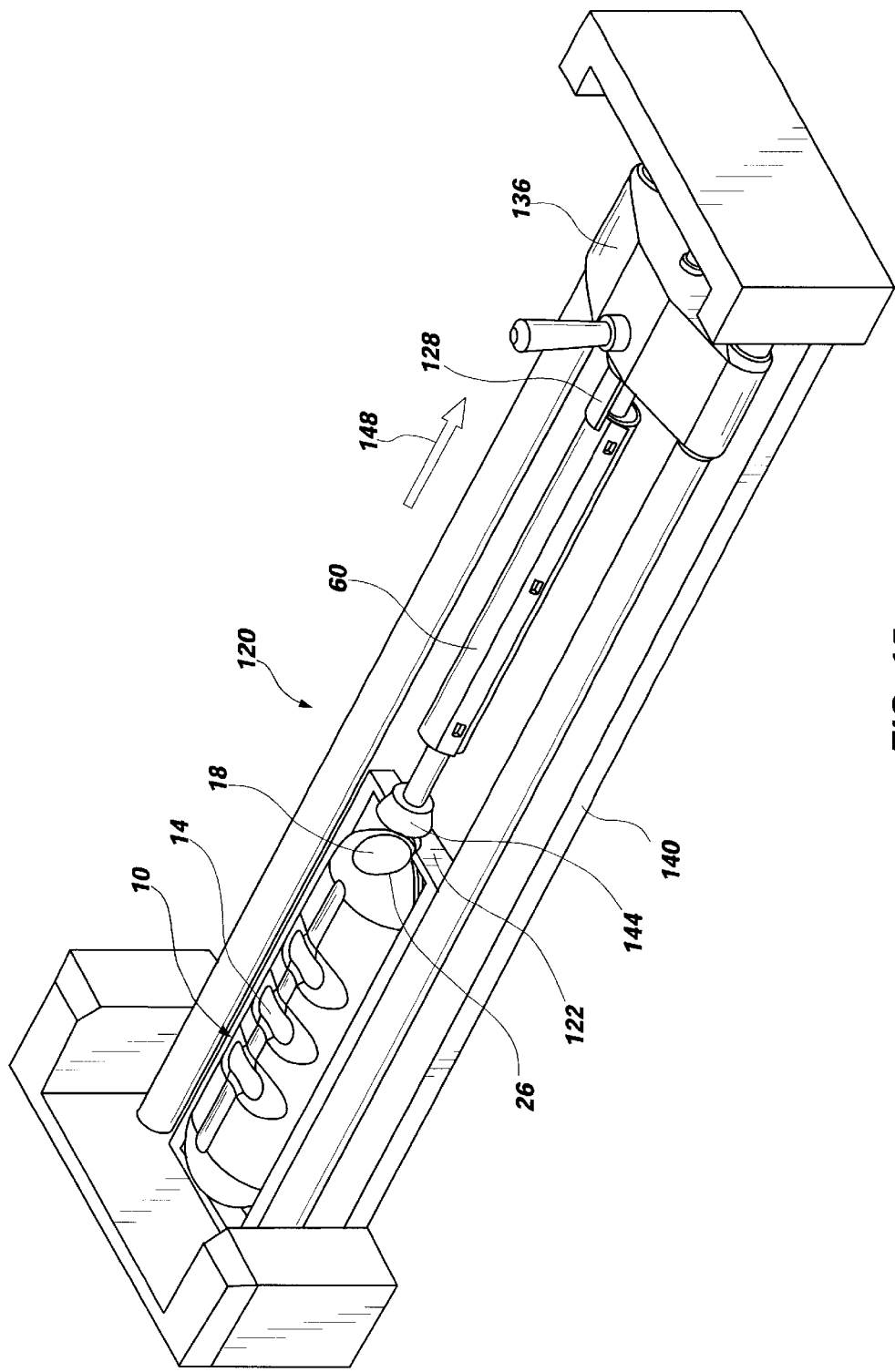

Referring to FIGS. 13–15, an extraction device 120 is shown for withdrawing the sleeve 60 from the cavity 24 of the bread bun 14 and preventing the fixings 18 from exiting the cavity 24. The extraction device 120 can include a holding enclosure 122 with an indentation 124 for receiving the bread bun 14 similar to that described above. Again, the holding enclosure 122 may secure and orient the bread bun 14. A gripping or pinching mechanism 128 may be configured to grip, grasp or pinch the sleeve 60. For example, the gripping mechanism 128 may have a pair of members 130 and 132 which receive a portion of the sleeve 60 therebetween. The members 130 and 132 may abut one another and be slightly flexible such that the sleeve 60 may be forced therebetween and held.

The gripping mechanism 128 can be attached to a carriage 136 slidably disposed on slides 138 attached to a base 140, so that the gripping mechanism 128 is slidably or movably disposed on the base 140 with respect to the bread bun 14 and holding enclosure 122. The slides 138 and carriage 136 preferably are aligned with the holding enclosure 122 and longitudinal axis 20 of the bread bun 14.

A stop or stop member 144 advantageously is disposed on the base 140, and located adjacent the holding enclosure 122, such that the stop member 144 is located adjacent the opening 26 of the bread bun 14 when disposed in the holding enclosure 122. In addition, the stop member 144 can be disposed on the end of an elongated rod oriented parallel with the direction of travel of the gripping mechanism 128.

Referring to FIG. 13, the bread bun 14, with sleeve 60 and fixings 18 therein, can be secured in the holding enclosure 122 with the stop member 144 located adjacent the opening 26 (best seen in FIG. 15) and one end of the sleeve 60. The gripping mechanism 128 then can be positioned to grip the sleeve 60.

Referring to FIG. 15, the gripping mechanism 128 and carriage 136 can be displaced away from the bread bun 14 along the longitudinal direction, indicated by arrow 148. As the gripping mechanism 128 is displaced, it withdraws the sleeve 60 from the bread bun 14. Meanwhile, the stop member 144 abuts the fixings 18, advantageously preventing the fixings 18 from exiting the cavity 24 with the sleeve 60. As the carriage 136 and gripping mechanism 128 displace 148, the sleeve 60 is drawn over the stop member 144 and rod 146. The bread bun 14 or sandwich 14 then may be removed from the holding enclosure 122.

Although the gripping mechanism 144 has been described as displacing on the base 140, it is of course understood that the holding enclosure 122 and stop member 144 may displace on the base 140.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A sandwich, comprising:
    a) a bread bun having a length and a substantially continuous wall forming a unitary, integral shell and a cavity in the bread bun and extending substantially the length of the bun; said bread bun includes an exterior crust and an opening through the crust into the cavity; and
    b) a plurality of layers of sandwich fixings, disposed in the cavity said layers of sandwich fixings are disposed in separate and arcuate layers in said cavity; and said layers of sandwich fixings inserted into the cavity of the bread bun by:
        1) placing the sandwich fixings as a plurality of separate layers onto a carrier;
        2) rolling said carrier into a cylindrical tubular sleeve with the separate layers of sandwich fixings therein;
        3) inserting the carrier with the separate layers of sandwich fixings therein through said opening into the cavity of the bread bun; and
        4) withdrawing the carrier from the cavity of the bread bun through said opening while preventing the sandwich fixings from exiting the cavity and thereby forming separate and arcuate layers of sandwich fixings in said cavity of the bread bun.

2. A sandwich in accordance with claim 1, wherein the cavity is formed by drilling through the crust and into the bread bun with an elongated, cylindrical drill bit without creating an interior crust.

3. A sandwich in accordance with claim 1, wherein the sandwich fixings are inserted into the bread bun by:
 1) placing the sandwich fixings as separate layers onto a flexible sheet;
 2) rolling the flexible sheet into a sleeve with the separate layers of sandwich fixings therein;
 3) inserting the flexible sheet with the separate layers of sandwich fixings therein through the opening and into the cavity of the bread bun; and
 4) withdrawing the sleeve from the cavity of the bread bun through the opening while preventing the sandwich fixings from exiting the cavity.

4. A sandwich in accordance with claim 1, wherein the sandwich fixings include sliced meat, sliced cheese, a vegetable or fruit, and condiments, inserted into the cavity by:
 a) stacking all the sandwich fixings in separate layers on the flexible sheet; and
 b) rolling the sheet to form the separate layers into separate arcuate layers by rolling the sheet into sleeve.

5. A sandwich, comprising:
 a) a pre-baked bread bun having a length, a substantially continuous wall forming a unitary, integral shell, an exterior crust, a cavity in the bread bun without an interior crust and extending substantially the length of the bun, and an opening in the exterior crust extending to the cavity; and
 b) a plurality of separate layers of sandwich fixings, disposed in the cavity of the bread bun and said layers are arranged in separate arcuate layers.

6. A sandwich in accordance with claim 1, wherein the cavity in the bread bun has a substantially circular shape, and wherein the separate arcuate layers of the sandwich fixings conform to the substantially circular shape of the cavity of the bread bun.

7. A sandwich in accordance with claim 1, wherein the separate layers of sandwich fixings have a layered configuration in the cavity of the bread bun that is substantially the same as a layered configuration prior to insertion into the cavity of the bread bun.

8. A sandwich in accordance with claim 1, wherein the arcuate layers of the sandwich fixings include:
 an arcuate layer of sliced meat;
 an arcuate layer of sliced cheese; and
 an arcuate layer of sliced vegetable or fruit.

9. A sandwich in accordance with claim 5, wherein the cavity in the bread bun has a substantially circular shape, and wherein the separate arcuate layers of the sandwich fixings conform to the substantially circular shape of the cavity of the bread bun.

10. A sandwich in accordance with claim 5, wherein the separate layers of sandwich fixings have a layered configuration in the cavity of the bread bun that is substantially the same as a layered configuration prior to insertion into the cavity of the bread bun.

11. A sandwich in accordance with claim 5, wherein the arcuate layers of the sandwich fixings include:
 an arcuate layer of sliced meat;
 an arcuate layer of sliced cheese; and
 an arcuate layer of sliced vegetable or fruit.

12. A sandwich, comprising:
 a) a pre-baked bread bun having a length, a substantially continuous wall forming a unitary, integral shell, an exterior crust, a cavity in the bread bun without an interior crust and extending substantially the length of the bun, and an opening in the exterior crust extending to the cavity; and
 b) a plurality of separate layers of sandwich fixings, disposed the cavity of the bread bun, the separate layers of sandwich fixings having a layered configuration in the cavity of the bread bun and a layered configuration prior to insertion into the cavity of the bread bun that are substantially the same.

13. A sandwich in accordance with claim 12, wherein the cavity in the bread bun has a substantially circular shape, and wherein the separate layers of sandwich fixings are disposed in arcuate layers that conform to the substantially circular shape of the cavity of the bread bun.

14. A sandwich, comprising:
 a) a pre-baked bread bun, having a length, a substantially continuous wall forming a unitary, integral shell, an exterior crust, a cavity in the bread bun without an interior crust and extending substantially the length of the bun and with a substantially circular cross-sectional shape and an opening in the exterior crust extending to the cavity and;
 b) a plurality of separate layers of sandwich fixings, disposed in the cavity of the bread bun, the layers being oriented in arcuate layers that conform to the substantially circular cross-sectional shape of the cavity of the bread bun, the separate arcuate layers of sandwich fixing having substantially a same separate arcuate layered configuration prior to insertion into the cavity of the bread bun.

15. A sandwich in accordance with claim 14, wherein the separate arcuate layers of the sandwich fixings include:
 an arcuate layer of sliced meat;
 an arcuate layer of sliced cheese; and
 an arcuate layer of sliced vegetable or fruit.

16. A sandwich in accordance with claim 1, wherein the separate arcuate layers are oriented to match the cavity.

17. A sandwich in accordance with claim 5, wherein the separate arcuate layers are oriented to match the cavity.

18. A sandwich in accordance with claim 12, wherein the layered configuration of the sandwich fixings is substantially arcuate and oriented to match the cavity.

* * * * *